United States Patent Office 3,496,212
Patented Feb. 17, 1970

3,496,212
PROCESS FOR PURIFYING ADIPONITRILE
John Derrick Davison, John Milton Dossor, and Charles Henry Vasey, Manchester, England, assignors to Imperial Chemical Industries Limited, London, England, a corporation of Great Britain
No Drawing. Filed June 26, 1967, Ser. No. 648,949
Claims priority, application Great Britain, July 1, 1966, 29,609/66; Feb. 9, 1967, 6,174/67
Int. Cl. C07c *121/76;* B01d *3/34*
U.S. Cl. 260—465.2                                    5 Claims

ABSTRACT OF THE DISCLOSURE

Purification of adiponitrile by treatment with an aldehyde in presence of water and a strong acid anion, preferably at pH 1 to 3, to convert impurities either to water-soluble derivatives or high boilers.

---

This invention relates to a process for purifying crude adiponitrile.

Adiponitrile is manufactured in large quantity as an intermediate in the production of nylon 66 (polyhexamethyleneadipamide). It is required in a high state of purity for reduction to pure hexamethylene diamine, one of the intermediates from which the polymer is directly made. Even very small amounts of impurity in the hexamethylene diamine have large effects upon the properties of the nylon polymer produced therefrom. Whether manufactured by dehydration of ammonium adipate (adipic acid and ammonia) or from 1,4-dichlorobutene and sodium cyanide, or by reductive dimerisation of acrylonitrile or by any other method, crude adiponitrile is difficult to purify sufficiently to make it acceptable as a nylon intermediate.

Crude adiponitrile obtained by dehydration of ammoniam adipate contains impurities which may be classified as (a) Incomplete conversion products, for example cyanovaleramide and cyanovaleric acid
(b) Degradation products, for example 1-cyano-cyclopentylidineimine and pyrimidine derivatives. The boiling points of some of these impurities are so close to that of adiponitrile that efficient purification by fractional distillation requires either multi-stage distillation or columns with very large numbers of plates and high reflux ratios.

As alternatives to fractional distillation it has been proposed to purify crude adiponitrile by fractional crystalisation, and by passage over exchange resins.

It has also been proposed to hydrolyse the imine impurity in crude adiponitrile to ketone before distilling. In a further proposal which has been made crude adiponitrile is treated with aqueous formaldehyde at high temperatures e.g. 100° C. to convert certain impurities into water-soluble methylol compounds.

According to the present invention a process for purifying adiponitrile comprises treating impure adiponitrile with an aldehyde in the presence of water, strong acid anions and cations comprising hydrogen ions, ammonium ions as hereinafter defined, or a combination thereof and thereafter separating adiponitrile from the mixture.

The term "ammonium ions" include ammonium itself and ions of organic primary or secondary amines particularly primary or secondary alkylamines and especially methylamine or dimethylamine.

The aldehyde used in the process of the invention is conveniently a water-soluble aldehyde, preferably formaldehyde, but if desired insoluble aldehydes can be used, for example immobilised in resin-bed form. The amount of aldehyde should be sufficient to react with all the impurity which it is desired to separate. Using formaldehyde amounts of about 1–2% on the weight of the impure adiponitrile are usually satisfactory.

Examples of strong acid anions which may be present are sulphate, nitrate, chloride, phosphate and p-toluenesulphonate. Of these, sulphate and nitrate are the preferred ions because of their cheapness and because they are less corrosive than chloride ions. For operation above a pH of about 3 strong carboxylic acid anions, e.g. formate ions can be present. For operation below a pH of about 3 the presence of strong inorganic acid anions is necessary.

A convenient method of carrying out the aldehyde treatment consists in dissolving the impure adiponitrile in a substantially water-insoluble solvent of low polarity, for example an aromatic hydrocarbon, e.g., benzene or toluene, and washing the solution with an aqueous solution containing a water-soluble aldehyde and cations as aforesaid. The aldehyde treatment may be carried out at any desired temperature between the freezing and boiling points of the liquids which are present, preferred operating temperatures being from ambient to about 50° C.

In the higher pH regions reaction of the aldehyde with impurities in the adiponitrile is somewhat slow, particularly below 20° C.

In a preferred form therefore the process of the invention comprises treating impure adiponitrile with an aldehyde in presence of an aqueous liquor of pH from 1 to 6, especially pH 1 to 3, containing strong acid anions and cations as aforesaid and thereafter separating adiponitrile from the mixture.

In the process of the invention, particularly when operated at pH 1–6, especially pH 1–3, the aldehyde washing step has the following effects:

(1) Neutral heterocyclic impurities (e.g. pyrroles) react with the aldehyde to give products which can be removed by water-washing, filtration or as high boiling still residues. When ammonium cations are present the products are usually water-soluble; when hydrogen ion only is used the products are usually solids or tars of high molecular weight.

(2) 2-cyanocyclopentylidineimine is hydrolysed to 2-cyanocyclopentanone which can more readily be separated from adiponitrile by distillation, or may preferably be removed by a subsequent alkaline extraction followed by a water wash.

(3) Heterocyclic and other bases are removed from the adiponitrile by solution in the aqueous liquor.

A preferred feature of our invention therefore comprises purifying impure adiponitrile by treating a solution thereof in a water-insoluble solvent of low polarity with a water-soluble aldehyde in presence of an aqueous liquor of pH from 1 to 3 containing strong acid anions and cations comprising hydrogen ions, ammonium ions as hereinbefore defined or a combination thereof, separating the non-aqueous phase and extracting it with aqueous alkali, subsequently washing the non-aqueous phase with water if desired, removing the solvent by distillation and distilling the adiponitrile to separate it from high boiling residues.

In this process the aldehyde-treatment may conveniently be carried out at ambient temperatures, for example, at 20° C. with no deliberate heating or cooling, but higher or lower temperatures can be used if desired. Contact times of 10–15 minutes have been found adequate at ambient temperatures and this makes the process especially well suited to continuous operation.

As aqueous alkali a solution of sodium hydroxide or ammonium hydroxide may conveniently be used. A subsequent water wash is beneficial in order to avoid the presence of alkali in the distillation stage, but is not essential. The distillation at the end of the process can be a fractionation to remove small amounts of low boiling material but the use of expensive fractionating equipment is not necessary.

Although in any of its forms the process of the invention may be carried out on crude adiponitrile such as is obtained by dehydration of ammonium adipate it is advantageous first to extract the crude product with a weak aqueous solution of ammonia, for example, of about 1% strength, or of an amine. There is frequently enough ammonia in crude adiponitrile to produce such an aqueous solution simply by extraction with water. Incomplete conversion products such as cyanovaleramide and cyanovaleric acid are removed by this treatment and may be recycled to increase the overall yield of adiponitrile.

The preferred embodiment of our process for purification of impure adiponitrile therefore comprises continuously extracting a solution thereof in a water-immiscible non-polar solvent with a weak aqueous solution of ammonia, recovering incomplete conversion products from the aqueous phase, and continuously extracting the non-aqueous phase with an aqueous solution of formaldehyde at pH 1–3 containing sulphate or nitrate ions, and hydrogen or ammonium ions and hereinbefore defined or a combination thereof, extracting the non-aqueous phase with aqueous alkali and then water, removing the solvent by distillation and distilling the adiponitrile to separate it from high boiling residues.

The invention is illustrated but not limited by the following examples in which the parts and percentages are by weight.

EXAMPLE 1

Adiponitrile (100 parts; made by dehydrating ammonium adipate) and toluene (100 parts) is extracted with dilute aqueous ammonia to remove under-conversion products. The organic layer is then stirred for 10 minutes at room temperature with a mixture of 35% aqueous formaldehyde (5 parts) and 10% aqueous sulphuric acid (10 parts). The aqueous layer (pH 1 to 1.5) is removed and the organic layer is washed with 5% aqueous sodium hydroxide (100 parts) and then water (100 parts). The tolueene is rmoved by distillation and the residual oil is distilled collecting the fraction boiling at about 155° C. (10 mm.).

The distillate is essentially pure adiponitrile, free from heterocyclic impurities and from 2-cyanocyopentylidineimine.

Underconversion products are recovered from the ammonia extract by evaporation of the water. If desired the adiponitrile dissolved in the aqueous solution can be largely extracted into fresh solvent before the evaporation. The concentrated underconversion products may be recycled to the adiponitrile reactor together with fresh adipic acid and ammonia to give a further crop of adiponitrile.

In this example the 10 parts of 10% aqueous sulphuric acid may be replaced by 10 parts of 10% aqueous nitric acid, hydrochloric acid, phosphoric acid or p-toluenesulphonic acid.

EXAMPLE 2

Adiponitrile (100 parts; made by dehydrating ammonium adipate) acetaldehyde (10 parts) and 10% aqueous sulphuric acid (10 parts) are stirred for 1 hour at room temperature. The aqueous layer (pH 1 to 1.5) is removed and the organic layer is washed with 1% aqueous sodium hydroxide (100 parts) and then water (100 parts).

After drying by evaporation, the product is distilled roughly, collecting the fraction boiling at about 155° C./ 10 mm.

The distillate is adiponitrile free from heterocyclic impurities and from 2-cyanocyclopentylidene imine.

EXAMPLE 3

Removal of heterocyclic compounds (of the type found in adiponitrile made by dehydrating ammonium adipate) as high boiling derivatives:

Adiponitrile (100 parts) containing about 500 parts per million of heterocyclic compounds is stirred for 10 minutes at room temperature with 85% phosphoric acid (1.5 parts) and 37% aqueous formaldehyde (1 part). The lower aqueous layer (pH about 2) is separated off and the residual oil washed with water (50 parts). The wet oil is dried over anhydrous calcium chloride and a sample (50 parts) distilled under reduced pressure (B.P. 155° C./10 mm.). The main fraction (45 parts) is colourless and virtually free from heterocyclic impurities and has no permanganate demand in acid. (Reaction over a period of one minute at room temperature.) The still residue is dark brown.

EXAMPLE 4

Adiponitrile (100 parts; made by dehydrating ammonium adipate) and toluene (100 parts) is extracted with dilute aqueous ammonia to remove underconversion products. The organic layer is then stirred for 20 minutes at 20–30° C. with a mixture of 35% aqueous formaldehyde (5 parts) and 10% aqueous ammonium sulphate (5 parts). The aqueous layer (pH 3) is removed and the organic layer is washed with 5% aqueous sodium hydroxide (100 parts) and then water (100 parts.) The toluene is removed by distillation and the residual oil is distilled collecting the fraction boiling at about 155° C./ 10 mm.

The distillate is essentially pure adiponitrile, free of heterocyclic impurities and from 2-cyanocyclopentylideneimine.

EXAMPLE 5

Adiponitrile is treated as in Example 4, but on a continuous basis. The adiponitrile-toluene mixture is extracted counter-currently in a 3 stage rotary disc extraction column. The extracted toluene solution is then treated with aqueous formaldehyde and ammonium sulphate in a stirred pot.

After separation of the aqueous layer, the toluene solution is counter-currently extracted with aqueous sodium hydroxide and water in that order in two further extractors. Most of the toluene is removed continuously in a still at atmospheric pressure and the remainder in another still at reduced pressure.

The product is flash-distilled leaving 3% as tails, to give adiponitrile free of heterocyclic impurities and cyanoimine.

EXAMPLE 6

Crude adiponitrile (100 parts) and toluene (100 parts) is extracted with 2% aqueous ammonia (100 parts) and water (100 parts) to remove underconversion products.

A mixture of 37% aqueous formaldehyde (5 parts) and 10% diethylamine hydrochloride (10 parts) is added and the mixture is stirred for 20 minutes at 20–30° C.

The aqueous layer (pH 3) is removed and the organic layer extracted with 2% aqueous sodium hydroxide (100 parts) and water (100 parts). After removal of toluene by evaporation the adiponitrile is distilled (155°/10 mm.) to give a product free of cyanoimine and heterocyclic impurities.

We claim:

1. A process for purifying impure adiponitrile containing impurities formed concurrently therewith by the dehydration of ammonium adipate, which process comprises washing said impure adiponitrile with a solution of a water-soluble aldehyde selected from the class consisting of formaldehyde and acetaldehyde in an aqueous electrolyte solution wherein the anions are selected from the class consisting of sulphate, nitrate, chloride, phosphate and p-toluene sulphonate ions and the cations are selected from the class consisting of hydrogen, ammonium ($NH_4^+$), alkylamine ions and mixtures thereof, the amount of water-soluble aldehyde being sufficient to react with all the impurity which it is desired to separate, the pH of the solution being from 1 to 6, the temperature of washing operation being from ambient to the boiling point and the duration thereof sufficient to permit reaction of impurities with the said aqueous solution, and thereafter recovering adiponitrile freed from the said impurities.

2. The process of claim 1 which comprises dissolving the impure adipontirile in a water-soluble hydrocarbon solvent, washing the resulting solution with said aqueous electrolyte solution, separating the resulting two phases and recovering the adiponitrile by distillation from the solvent phase.

3. The process of claim 1 wherein the pH of the aqueous electrolyte is 1 to 3.

4. The process of claim 1 which comprises washing a solution of said impure adiponitrile in water-soluble hydrocarbon solvent with said aqueous electrolyte solution, said aqueous solution having a pH of 1 to 3, separating the resulting organic phase from the aqueous phase, extracting the separated organic phase with aqueous alkali, thereafter removing the organic solvent by distillation and recovering the purified adiponitrile by distilling the adiponitrile to separate same from any high boiling residues.

5. The process of claim 1 which comprises continuously extracting a solution of the impure adiponitrile in a water-immiscible non-polar hydrocarbon solvent with a weak aqueous solution of ammonia, recovering incomplete conversion products from the aqueous phase, continuously extracting the non-aqueous phase with an aqueous solution of formaldehyde at pH 1–3 containing sulphate or nitrate ions and hydrogen or ammonium ions or a combination thereof, extracting the non-aqueous phase with aqueous alkali and then water, removing the solvent by distillation and distilling the adiponitrile to separate it from high boiling residues.

References Cited

UNITED STATES PATENTS 2,305,103   12/1942   Osgood _____ 260—465.8 XR
3,360,541   12/1967   Korchinsky et al. ___ 260—465.8

JOSEPH P. BRUST, Primary Examiner

U.S. Cl. X.R.

203—36, 39; 260—464, 465.4; 465.8